United States Patent [19]

Hoefling

[11] Patent Number: 6,162,146
[45] Date of Patent: Dec. 19, 2000

[54] ELECTROHYDRAULIC CONTROL DEVICE FOR A DRIVE TRAIN OF A MACHINE

[75] Inventor: Kenneth J. Hoefling, St. Ismier, France

[73] Assignee: Caterpillar Inc., Peoria, Ill.

[21] Appl. No.: 09/301,424

[22] Filed: Apr. 28, 1999

[51] Int. Cl.$^7$ .................................................. B60K 41/28
[52] U.S. Cl. .............................. 477/73; 477/77; 477/211; 477/204
[58] Field of Search .................... 477/73, 77, 78, 477/83, 94, 95, 210, 211, 203, 204, 205; 192/3.58, 219, 220, 220.1, 221, 13 R

[56] References Cited

U.S. PATENT DOCUMENTS

| | | | |
|---|---|---|---|
| 3,700,081 | 10/1972 | Porter et al. | 477/83 |
| 4,014,419 | 3/1977 | McKnight | 192/13 R |
| 4,592,455 | 6/1986 | Bubak | 192/13 R |
| 5,040,648 | 8/1991 | Mitchell et al. | 192/3.58 |
| 5,048,655 | 9/1991 | Seeba | 192/3.58 X |
| 5,099,969 | 3/1992 | Ohtake | 192/3.58 X |
| 5,137,127 | 8/1992 | Braun | 477/195 |
| 5,380,257 | 1/1995 | Coffman et al. | 477/175 |
| 5,456,333 | 10/1995 | Brandt et al. | 192/3.58 X |
| 5,509,520 | 4/1996 | Evans et al. | 192/3.58 X |
| 5,519,996 | 5/1996 | Ko | 192/221 X |
| 5,583,768 | 12/1996 | Hamajima et al. | 477/83 X |
| 5,613,581 | 3/1997 | Fonkalsrud et al. | 192/219 X |
| 5,863,277 | 1/1999 | Melbourne | 477/203 |
| 5,865,709 | 2/1999 | Tamura et al. | 477/83 X |
| 5,947,242 | 9/1999 | Creger | 192/221 X |

*Primary Examiner*—Charles A Marmor
*Assistant Examiner*—Ha Ho
*Attorney, Agent, or Firm*—David M. Masterson; James E. Smith

[57] ABSTRACT

In one aspect of the present invention, an electrohydraulic control device for a drive train of a machine is disclosed. A control member produces an operator control signal. An engine control module receives the operator control signal and responsively reduces the rotational speed of the engine. A transmission control module additionally receive the operator control signal and responsively controls the engagement of a predetermined transmission clutch to reduce the transmitted torque from the transmission.

10 Claims, 2 Drawing Sheets

ELECTROHYDRAULIC CONTROL DEVICE FOR A DRIVE TRAIN OF A MACHINE

The present invention relates generally to an electrohydraulic control device for controllably operating a machine to reduce drive train torque, and more particularly to an electrohydraulic control device for selectively controlling the pressure of a transmission clutch and engine speed to reduce drive train torque.

BACKGROUND ART

It is desirable to control the drive train torque of a machine while the machine is dozing or digging. For example, in an earth working type machine, an operator typically "inches" the machine when working material while providing full power to the implement hydraulics to capture the material. It is important to control the amount of drive train torque to reduce rimpull, which is useful for reducing slipping.

In one conventional method of inching, the transmission is kept in gear and the brakes are manually modulated by use of a foot pedal. In another conventional method of inching, an impeller clutch is connected between a machine's engine and transmission. Typically, the impeller clutch is actuated through an operator pedal. The operator pedal acts to engage and disengage the impeller clutch; thereby, varying the power transmitted by the drive train to slow the machine.

However, the prior art methods of controlling the machine to reduce drive train torque, reduce slipping and prevent engine stalling are largely undesirable because it requires considerable operator effort. Typically, three operator pedals are needed, one to control the engine acceleration, one to control clutch pressure, and yet another to control machine braking. What is needed is an electrohydraulic control device that regulates the amount of drive train torque and prevents engine stall while being easily manipulated by the operator.

The present invention is directed to overcoming one or more of the problems as set forth above.

DISCLOSURE OF THE INVENTION

In one aspect of the present invention, an electrohydraulic control device for a drive train of a machine is disclosed. A control member produces an operator control signal. An engine control module receives the operator control signal and responsively reduces the rotational speed of the engine. A transmission control module additionally receives the operator control signal and responsively controls the engagement of a predetermined transmission clutch to reduce the transmitted torque from the transmission.

BRIEF DESCRIPTION OF THE DRAWINGS

For a better understanding of the present invention, reference may be made to the accompanying drawings in which.

BEST MODE FOR CARRYING OUT THE INVENTION

Figure 1:
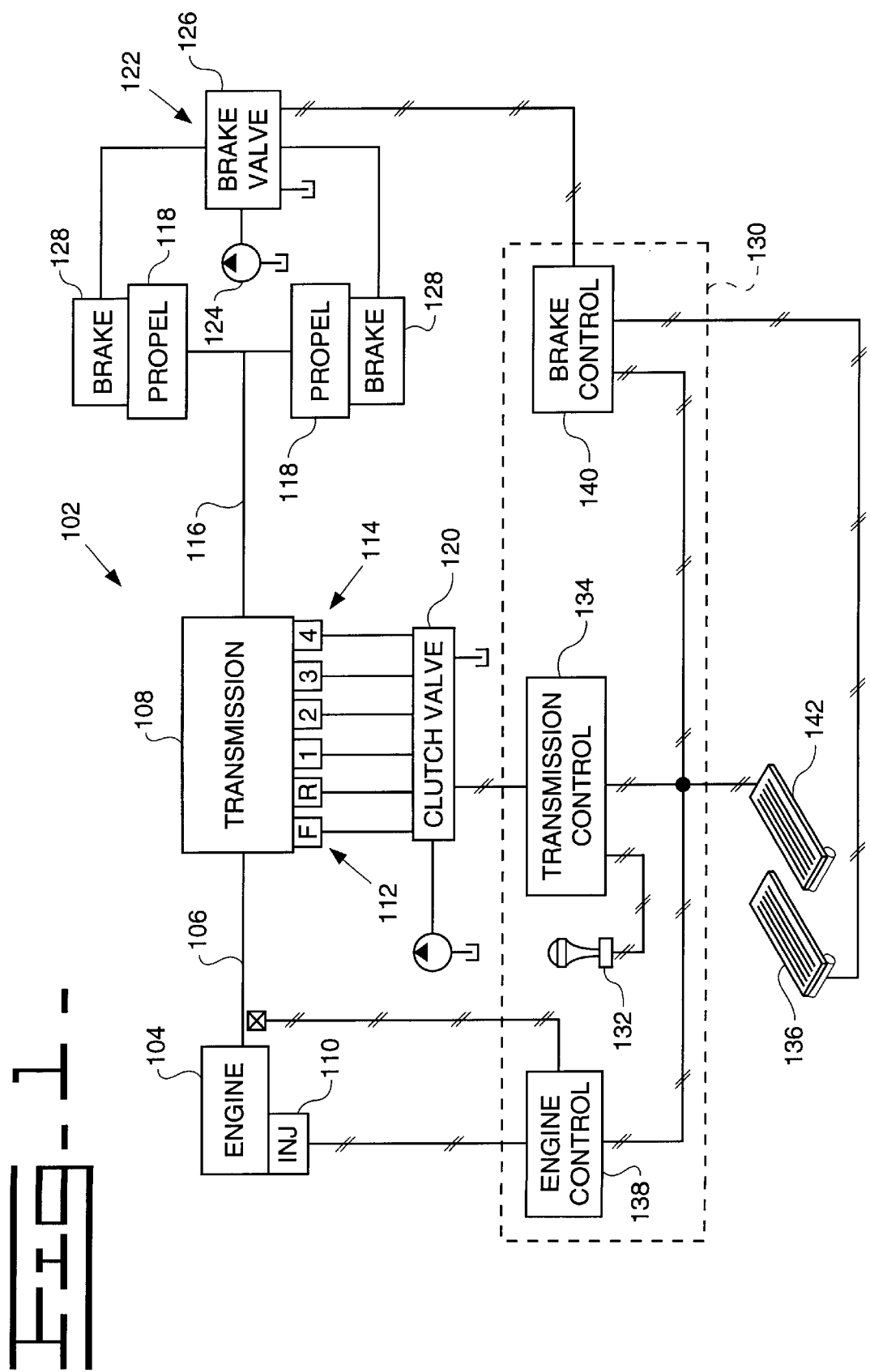
FIG. 1 shows a block diagram of a power train control system for a machine.

The present invention is directed toward controlling the drive train torque of an earth working machine; such as a bulldozer, wheel loader, track loader, or the like. A power train or drive train 102 of the machine is illustrated in FIG. 1. The drive train includes an internal combustion engine 104 having an output shaft 106 that provides the input to a multispeed transmission 108. Preferably, the engine 104 includes a plurality of solenoid operated fuel injectors 110 that are used to control the amount of fuel delivered to the cylinders of the engine. The transmission 108 includes a plurality of interconnected planetary gear sets selectively engaged in cooperating groupings by operation of a pair of disc-type directional clutches 112 and a plurality of disc-type speed clutches 114. The output of the transmission rotates a drive line 116 that is connected to the propelling mechanisms 118 of the machine. The propelling mechanisms may include an axle that rotates a set of drive gears for rotating an endless track or a set of drive wheels that directly propel the machine.

An electrohydraulic clutch pressure control valve 120 directs fluid under pressure to selected clutches 112,114 to control the engagement thereof. In one embodiment, four forward and four reverse speeds can be obtained with the actuation of the clutch control valve 120 that is in selective communication with the clutches.

Braking of the machine is initiated through a service brake mechanism 122 which includes a fluid pressure source 124 which provides pressurized fluid to a brake control valve 126 that directs the pressurized fluid to a set of brakes 128 to control the associated braking pressure thereof.

An electrohydraulic control device shown generally by the dashed box and labeled as reference number 130 is provided to control the operation of the drive train. The control device 130 includes one or more electronic control modules each containing a microprocessor. The term microprocessor is meant to include microcomputers, microprocessors, integrated circuits and the like capable of being programmed. The electrohydraulic control device 130 contains sufficient electronic circuitry to convert input signals from a plurality of sensors and switches to a form readable by the microprocessor, and circuitry to generate command signals with sufficient power to drive a plurality of solenoids for actuating the clutch valve 120, brake valve 126, and injectors 110 according to signals produced by the control modules.

The service brake mechanism 122 includes a brake pedal or left hand pedal 136 that is manually depressible about a transverse pin. When depressed, the brake pedal 136 actuates a rotary sensor that produces an electronic signal in a pulse width modulated form having a duty factor response to the pedal position. An electronic brake control module 140 receives the signal from the brake pedal 136 and produces a braking command signal to the brake control valve 126 to control the braking force of the brake set 128 in response to the amount of depression of the brake pedal 136.

An operator control handle 132 is provided to selectively control the operation of the transmission 108. The control handle may be in the form of a joystick which generates an electronic signals which are indicative of a desired gear ratio and/or direction of the machine. The signals are delivered to an electronic transmission control module 134, which generates transmission command signals to the clutch valve 120 to selectively engage the desired direction and speed clutches 112,114.

A control member or depressable right pedal 142 is provided for selectively controlling the torque associated with the power train. The right pedal 142 is rockable about a transversely oriented pivot pin between a minimum and a maximum position and produces an operator control signal. When depressed, the right pedal 142 actuates a rotary sensor that produces the operator control signal in a pulse width modulated form having a duty factor response to the pedal position.

The right pedal position is used to represent a desired rotational speed of the engine 104. As the right pedal 142 is depressed from an elevated position to an intermediate position, the rotational speed of the engine is proportionately reduced. When the right pedal is depressed, an operator control signal is generated proportional to the pedal position and is delivered to an electronic engine control module 138. In response, the engine control module 138 produces an engine speed control signal to selectively operate the fuel injectors 110 to de-rate the engine speed.

The right pedal position is additionally used to represent a desired amount of transmitted torque of the transmission 108 to the drive line 116. As the right pedal 142 is depressed from an elevated position to an intermediate position, the ability of the transmission 108 to transmit torque vis-a-vis the selected direction clutch 112 is reduced. When the right pedal is depressed, the resulting operator control signal is delivered to the transmission control module 134, which responsively produces a transmission control signal to selectively operate the clutch valve 120 to control the engagement of the selected direction clutch 112.

Moreover, the right pedal position is used to represent a desired amount of braking force of the service brake mechanism 122. As the right pedal 142 is depressed from an elevated position to an intermediate position, the amount of braking force of the brake set 140 is increased. When the right pedal is depressed, the resulting operator control signal is delivered to an electronic brake control module 140, which delivers a braking control signal to the brake control valve 126 to controllably increase the degree of engagement of the brake set 128.

Figure 2:
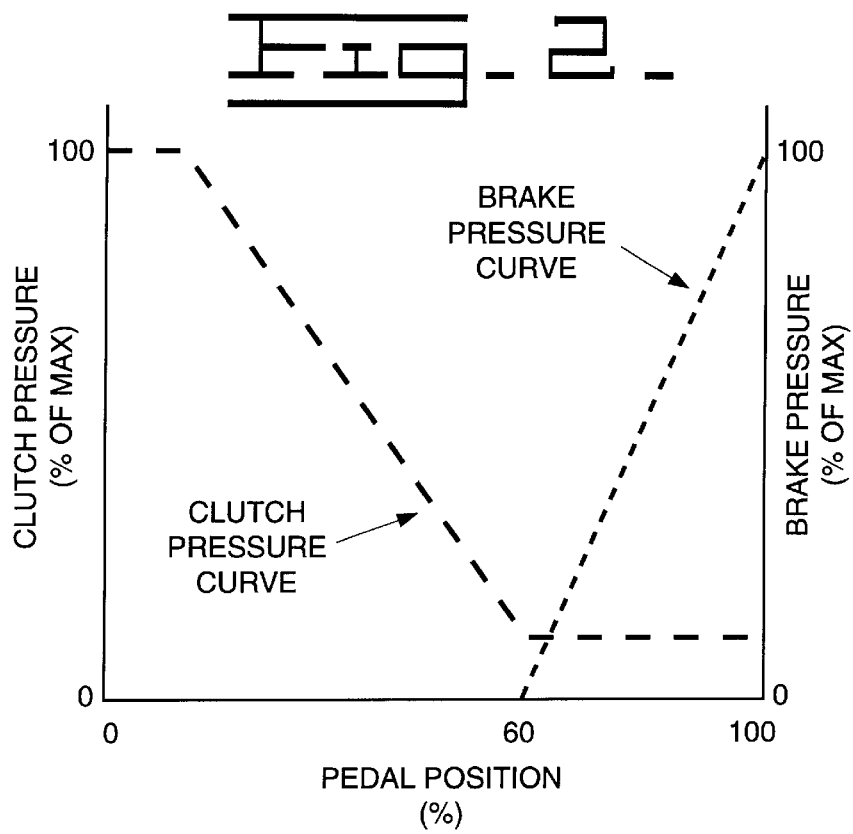
FIG. 2 shows a graph illustrating transmission clutch pressure and brake pressure verses pedal position.

As described above, the transmission clutch pressure and engine speed are modulated in response to the depression of the right pedal to provide for an open loop drive line torque control. Further, the service brakes are modulated in response to the right pedal position. Reference is now made to the graph shown in FIG. 2 which illustrates the transmission clutch pressure as a percentage of maximum and the brake pressure as a percentage of maximum; both as a function of the right pedal depression. As represented in the graph, as the right pedal is depressed from a fully elevated first position (represented by 0%) to an intermediate second position (represented by 60% of depression), the electronic transmission control module adjusts the selected direction clutch pressure proportionally. Further depression of the pedal beyond the second position, progressively directs the actuation of the service brakes until a fully (100%) depressed third position is reached. Therefore a predetermined amount of overlap between the transmission clutch pressure and brake actuation occurs to control the drive line torque.

Figure 3:
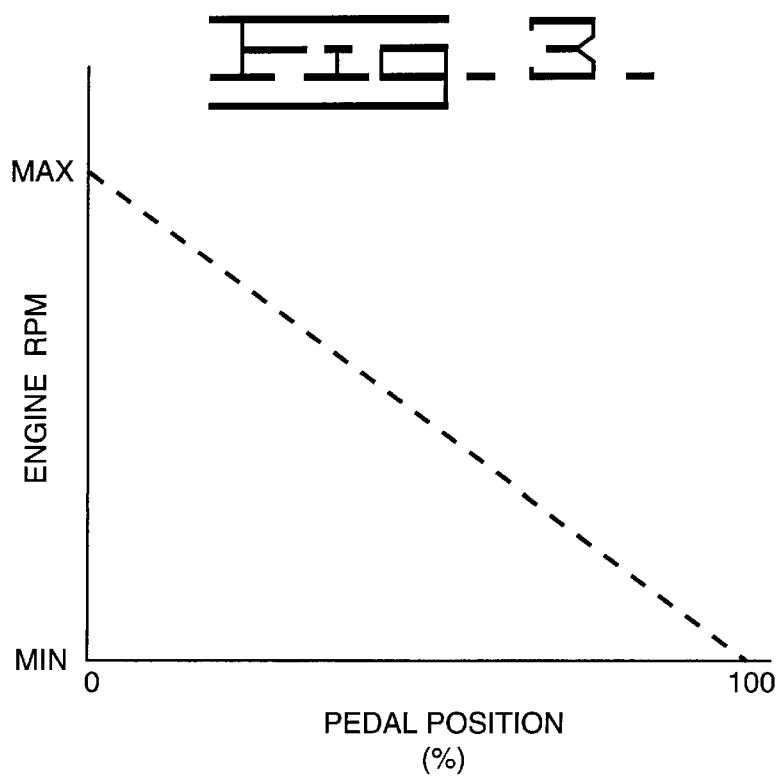
FIG. 3 shows a graph illustrating engine speed verses pedal position.

Reference is now made to the graph shown in FIG. 3 which illustrates the engine speed as a function of the right pedal depression. As represented in the graph, as the right pedal is depressed from the fully elevated first position to any intermediate position, the electronic engine control module reduces the engine in a proportional manner from the engine throttle speed to a minimum engine speed.

In the preferred embodiment, a two-dimensional look-up table of a type well known in the art is used to store the desired characteristics represented by the graphs. The number of characteristics stored in memory is dependent upon the desired precision of the system. Interpolation may be used to determine the actual value in the event that the measured values fall between the discrete values stored in memory. The table values are derived from simulation and analysis of empirical data. Although a look-up table is described, it is well known in the art that an empirical equation may readily be substituted for the look-up table if greater accuracy is desired.

Thus, while the present invention has been particularly shown and described with reference to the preferred embodiment above, it will be understood by those skilled in the art that various additional embodiments may be contemplated without departing from the spirit and scope of the present invention. For example, the specific configurations of the of the curves represented by the graphs are shown for illustrative purposes, and the actual configurations of the curves may have various shapes depending on the desired response of the system.

Industrial Applicability

With respect to the drawings and in operation, the present invention controls the torque of the drive line of a machine. This allows the operator to "inch" the machine while reducing rimpull to reduces slipping of the machine and stalling of the engine. To this end, the electrohydraulic control device vis-a-vis a single operator pedal controls the transmission clutch pressure and brake pressure to pressure levels defined by the predefined curves in response to the pedal position to reduce the drive line torque. To provide the operator with further control over the drive line torque, the present invention controls the speed of the engine to decrease the amount of energy that the clutch must dissiapate via the same operator pedal the controls the clutch and brake pressure levels. Thus, the present invention provides for improved control of the drive line torque while providing ease of use by the operator through one operator pedal.

Other aspects, objects and advantages of the present invention can be obtained from a study of the drawings, the disclosure and the appended claims.

What is claimed is:

1. A control device for a drive train of a machine, the drive train including an engine and transmission having a plurality of directional and speed clutches, comprising:

a control member being manually moveable and adapted to produce an operator control signal;

an engine control module being adapted to receive the operator control signal and responsively reduce a rotational speed of the engine;

a clutch pressure control valve adapted to direct fluid under pressure to a selected one of the clutches and control the engagement thereof;

a transmission control module being adapted to additionally receive the operator control signal and responsively deliver a transmission control signal to the pressure control valve to controllably decrease an amount of engagement of the selected one of the clutches to reduce a transmitted torque from the transmission in response to an amount of movement of the control member;

a set of brakes and a brake control valve adapted to direct fluid under pressure to the brake set and control an engagement thereof; and a brake control module being adapted to additionally receive the operator control signal and responsively control the engagement of the brake set, wherein the brake control module delivers a braking control signal to the brake control valve to controllably increase an amount of engagement of the brake set in response to an amount of movement of the control member.

2. A control device, as set forth in claim 1, wherein the control member includes a foot pedal being depressible between first, second, and third positions.

3. A control device, as set forth in claim 2, wherein the electronic engine control module produces an engine control signal to reduce the engine speed in proportion to the depression of the foot pedal from the first position.

4. A control device, as set forth in claim 3, wherein the transmission control module produces the transmission control signal to reduce pressure associated with the selected clutch in response to the foot pedal being depressed between the first and second positions.

5. A control device, as set forth in claim 4, wherein the brake control module produces the brake control signal to increase brake pressure associated with the brake set in response to the foot pedal being depressed between the second and third positions.

6. A method for a drive train of a machine, the drive train including an engine, a transmission having a plurality of directional and speed clutches, and a set of brakes, the method comprising the steps of:

producing an operator control signal;

receiving the operator control signal and responsively reducing a rotational speed of the engine;

receiving the operator control signal and responsively controlling an engagement of a selected one of the clutches to reduce a transmitted torque from the transmission; and responsively controlling an engagement of the brake set in response to the operator control signal.

7. A method, as set forth in claim 6, the machine including a foot pedal being depressible between first, second, and third positions, the method including the step of producing an engine control signal to reduce the engine speed in proportion to the depression of the foot pedal from the first position.

8. A method, as set forth in claim 7, including the step of reducing pressure associated with the selected clutch in response to the foot pedal being depressed between the first and second positions.

9. A method, as set forth in claim 8, including the step of increasing brake pressure associated with the brake set in response to the foot pedal being depressed between the second and third positions.

10. A control device for a drive train of a machine, the drive train including an engine, a transmission having a plurality of directional and speed clutches, and a set of brakes, comprising:

a foot pedal being depressible between first, second, and third positions;

an engine control module being adapted to reduce an engine speed in proportion to the depression of the foot pedal from the first position;

a transmission control module being adapted to reduce engagement of a selected one of the clutches in response to the foot pedal being depressed between the first and second positions; and a brake control module being adapted to increase engagement of the brake set in response to the foot pedal being depressed between the second and third positions.

* * * * *